Dec. 18, 1928.
D. C. GOLDSTON
1,695,327
MOLDING MACHINE
Filed Feb. 7, 1924     13 Sheets-Sheet 1
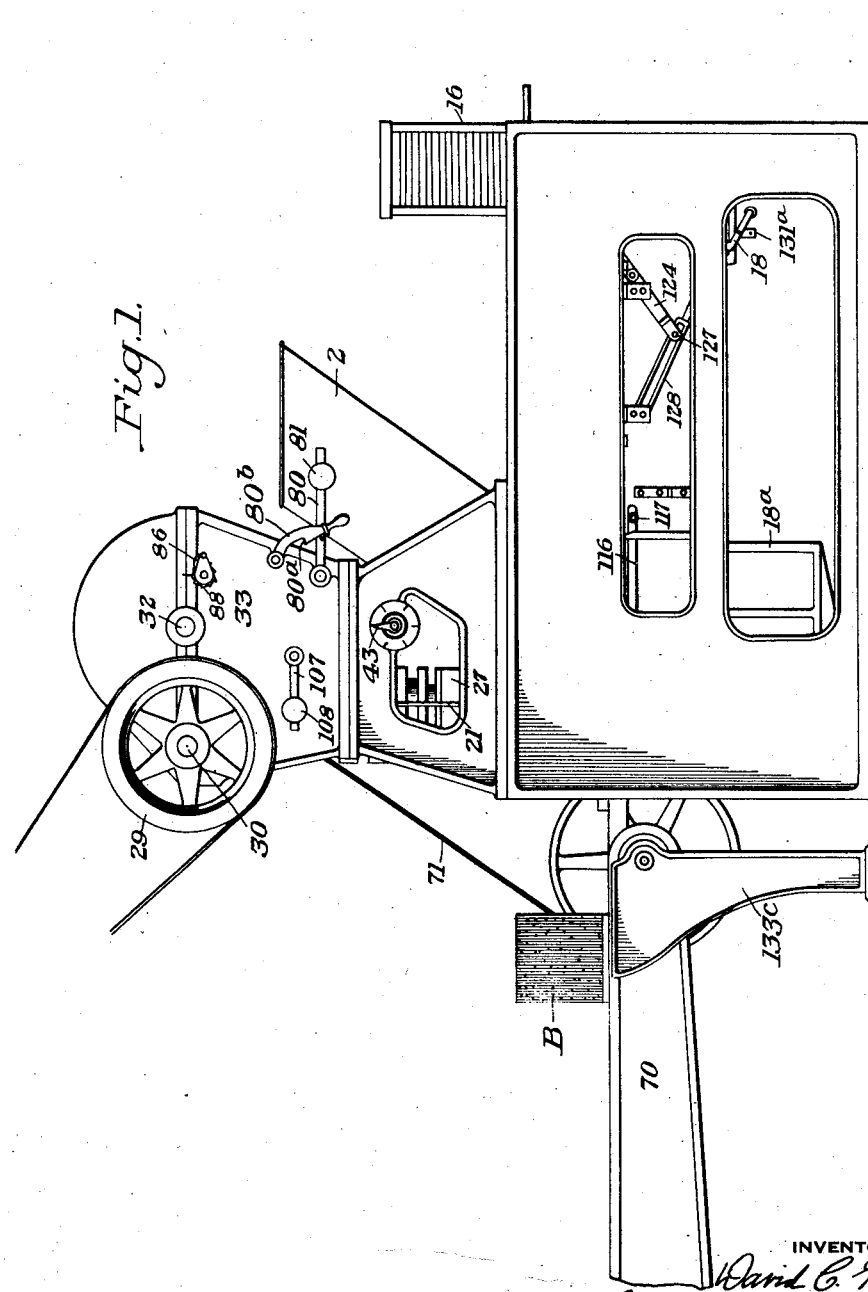

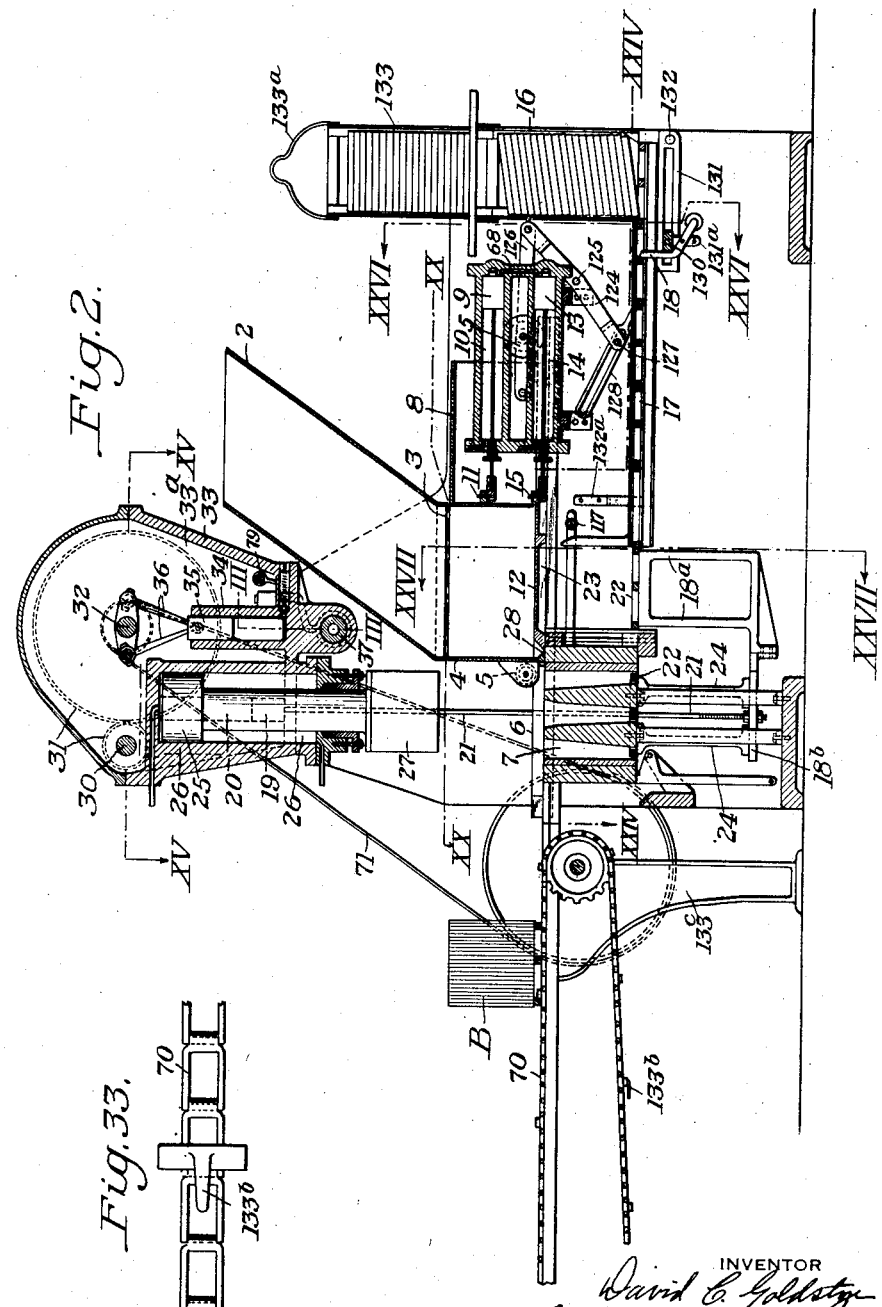

Dec. 18, 1928.
D. C. GOLDSTON
1,695,327
MOLDING MACHINE
Filed Feb. 7, 1924     13 Sheets-Sheet 3
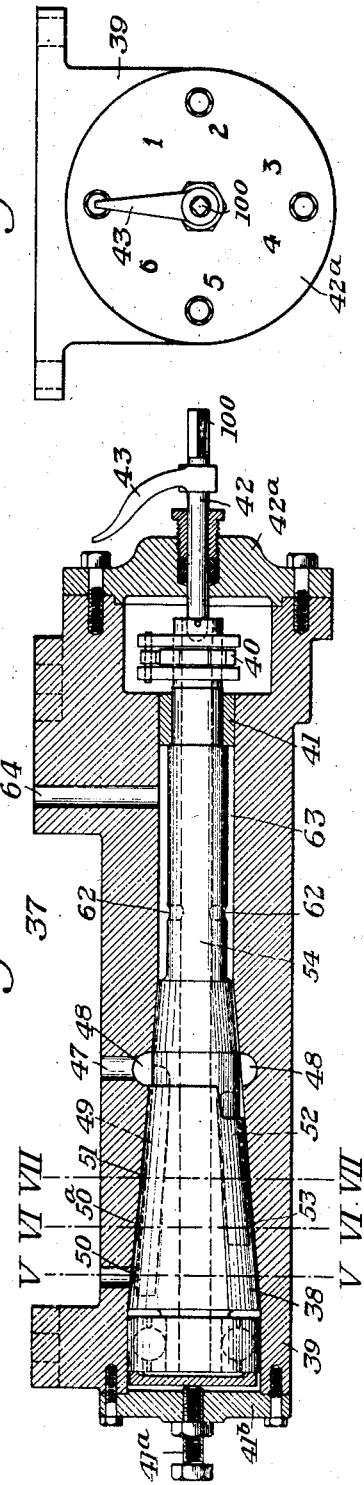
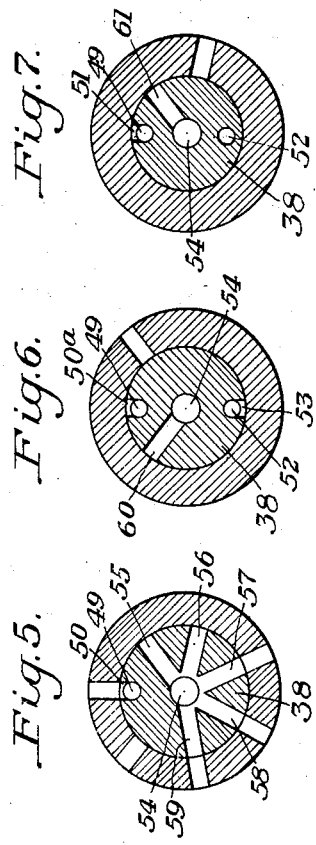

Dec. 18, 1928.

D. C. GOLDSTON 1,695,327

MOLDING MACHINE

Filed Feb. 7, 1924  13 Sheets-Sheet 4

INVENTOR

Dec. 18, 1928.

D. C. GOLDSTON 1,695,327

MOLDING MACHINE

Filed Feb. 7, 1924    13 Sheets-Sheet 5

INVENTOR

Dec. 18, 1928.                                              1,695,327
D. C. GOLDSTON
MOLDING MACHINE
Filed Feb. 7, 1924        13 Sheets-Sheet 6

INVENTOR

Dec. 18, 1928.  1,695,327
D. C. GOLDSTON
MOLDING MACHINE
Filed Feb. 7, 1924   13 Sheets-Sheet 7
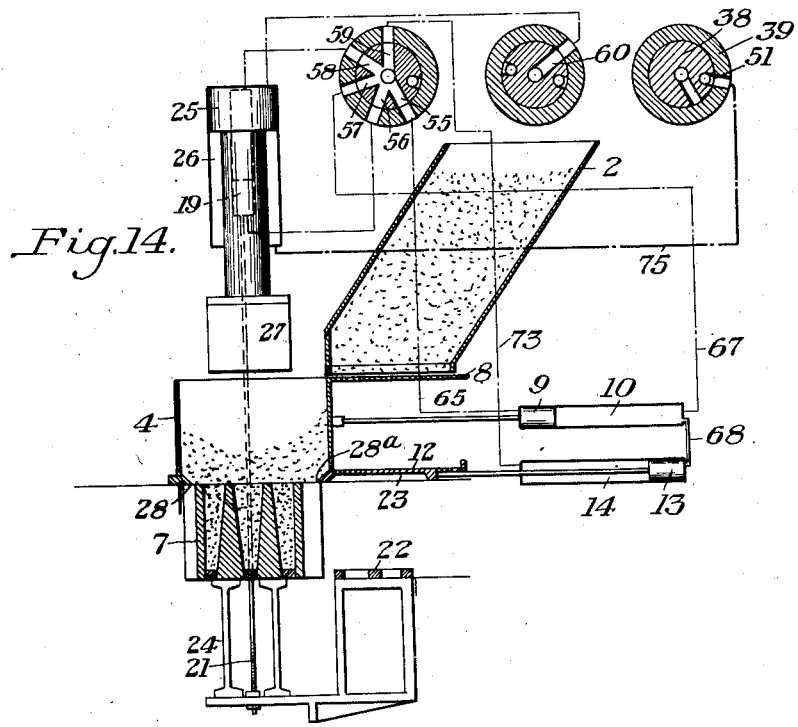
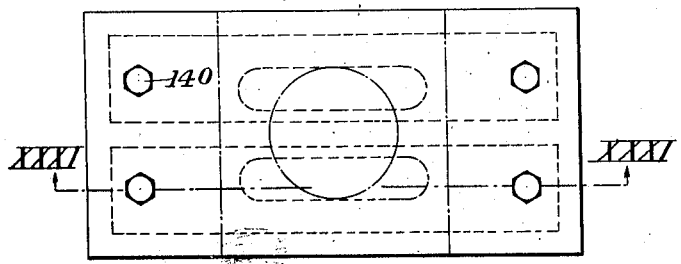
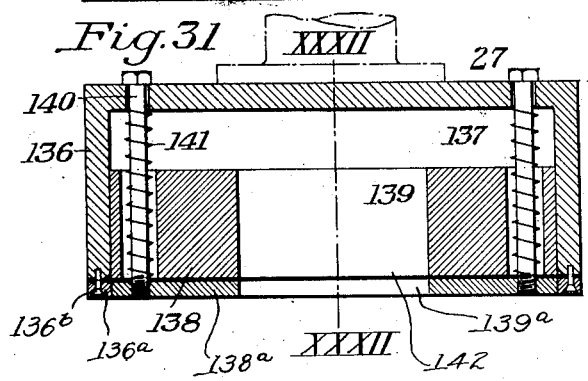
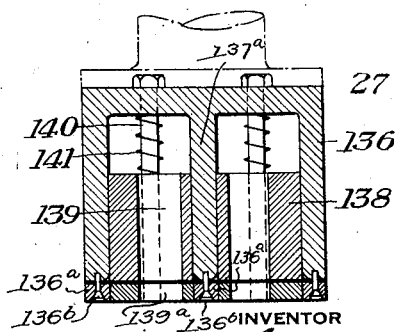

Dec. 18, 1928.      1,695,327
D. C. GOLDSTON
MOLDING MACHINE
Filed Feb. 7, 1924      13 Sheets-Sheet 8

INVENTOR
David C. Goldston
By Byrnes, Stebbins, Parmelee
his Attys

Dec. 18, 1928.

D. C. GOLDSTON

MOLDING MACHINE

Filed Feb. 7, 1924   13 Sheets-Sheet 9

1,695,327

INVENTOR

Dec. 18, 1928.
D. C. GOLDSTON
1,695,327
MOLDING MACHINE
Filed Feb. 7, 1924
13 Sheets-Sheet 10
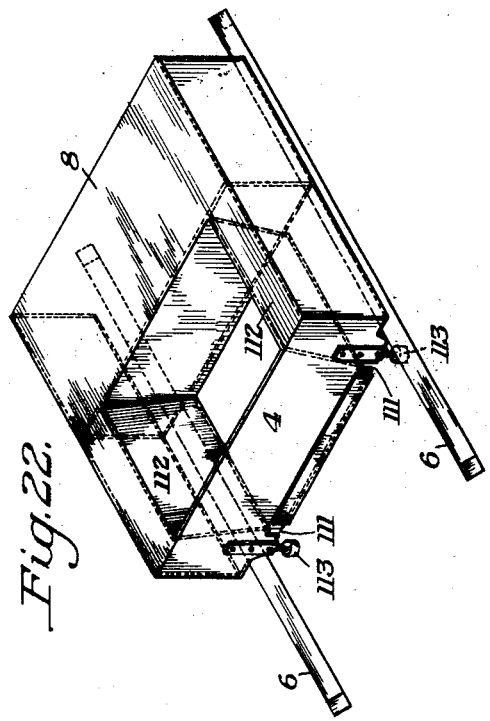
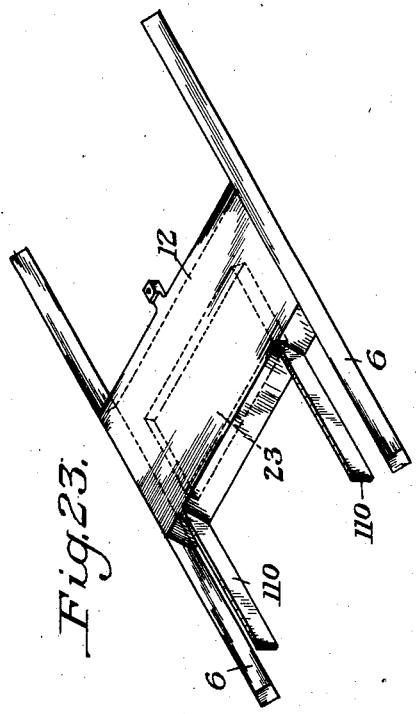
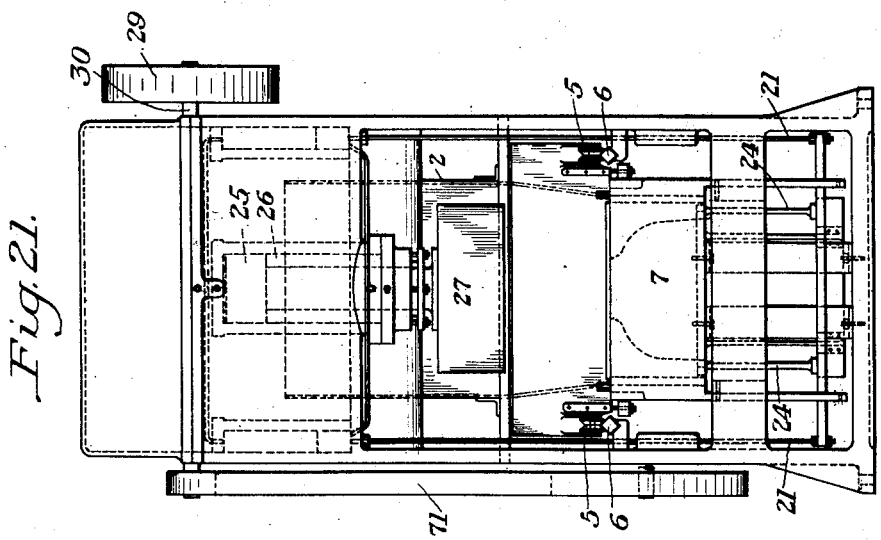
INVENTOR
David C. Goldston
By Byrnes, Stebbins & Parmelee
His Attys Dec. 18, 1928.

D. C. GOLDSTON 1,695,327

MOLDING MACHINE

Filed Feb. 7, 1924

INVENTOR
David C. Goldston

Dec. 18, 1928.

D. C. GOLDSTON 1,695,327

MOLDING MACHINE

Filed Feb. 7, 1924   13 Sheets-Sheet 12

INVENTOR

Patented Dec. 18, 1928.

1,695,327

UNITED STATES PATENT OFFICE.

DAVID C. GOLDSTON, OF CAMBRIDGE SPRINGS, PENNSYLVANIA, ASSIGNOR TO BLYSTONE MANUFACTURING COMPANY, OF CAMBRIDGE SPRINGS, PENNSYLVANIA, A CORPORATION OF PENNSYLVANIA.

MOLDING MACHINE.

Application filed February 7, 1924. Serial No. 691,213.

This invention relates broadly to molding machines, and more particularly to machines for molding building blocks, such as hollow tiles. The apparatus disclosed herein is useful for molding bricks or building blocks from any of the usual materials, either by tamping or by direct compression, a machine of the latter type being generally preferred and being herein illustrated.

I provide for making compressed blocks by supplying an excess of material to a mold chamber, compressing the material, removing the excess material from the compressed block and utilizing the same in a succeeding block. This is preferably accomplished by providing a feed box adapted to receive a definite quantity of material from a suitable source, moving the feed box into position over the mold chamber and feeding the material from the box to the mold chamber. After the loose material has been placed in the mold chamber, the desired compression is effected by means moving through the feed box, after which the latter is returned to its original position, being effective on the return stroke for removing the excess material from the compressed block.

As is well known in this art, it is desirable to deliver every block from a machine of this character on a suitable supporting pallet, and I provide suitable means for feeding the pallets in succession to the mold chamber. This is preferably accomplished by simultaneously feeding a pallet and the material to be compressed into position over the mold chamber, depositing the pallet into position to receive the material and thereafter delivering the material from the feed box.

In order to secure blocks of uniform density it is highly desirable that the material be fed into the mold chamber in such manner that it is of uniform density and depth in its loose condition therein prior to being compressed. For achieving this result I provide a slidable bottom closure for the feed box, which supports the material in the feed box until it is in position over the mold chamber, after which the slidable bottom is retracted so that the material is fed in uniform quantities from a uniform height to all parts of the mold chamber. This greatly improves and renders more uniform the product of the machine.

When a hollow block is to be molded, cores are provided in the mold chamber, as is well known, and in order to further insure uniform density of the finished blocks I provide for applying varying pressures to the material in different portions of the mold chamber in order to compensate for the effect of the cores on the material fed to the mold chamber adjacent thereto, it being desirable to subject the material adjacent the cores to relatively less pressure than the material adjacent the walls of the mold chamber. The uneven block is cut down by the return stroke of the feed box, which removes the excess material and gives a block of uniform size.

I provide a machine which is entirely automatic in operation, since, once it is set in operation, it supplies pallets and material to the mold chamber and delivers the completed blocks continuously without any hand operations or controls until the machine is stopped or rendered inoperative. In order to secure the high pressures desired and to secure a machine of great flexibility, I preferably provide fluid means for operating the machine, including automatically operated valve means for effecting in proper sequence the various operations of the machine. Since it is also desirable to allow a considerable period of time for the compression of the block as compared with the time required for the other operations, I provide for operating the valve means at varying time intervals.

While I have pointed out in a general way the more important features of my invention, additional features will be apparent as the description proceeds.

In the accompanying drawings illustrating the present preferred embodiment of my invention,—

Figure 1 is a side elevation of a molding machine embodying my invention;

Figure 2 is a vertical section through the machine shown in Figure 1;

Figure 3 is a section on the line III—III of Figure 2, showing the automatic control valve;

Figure 4 is an end elevation of the valve shown in Figure 3;

Figure 15:
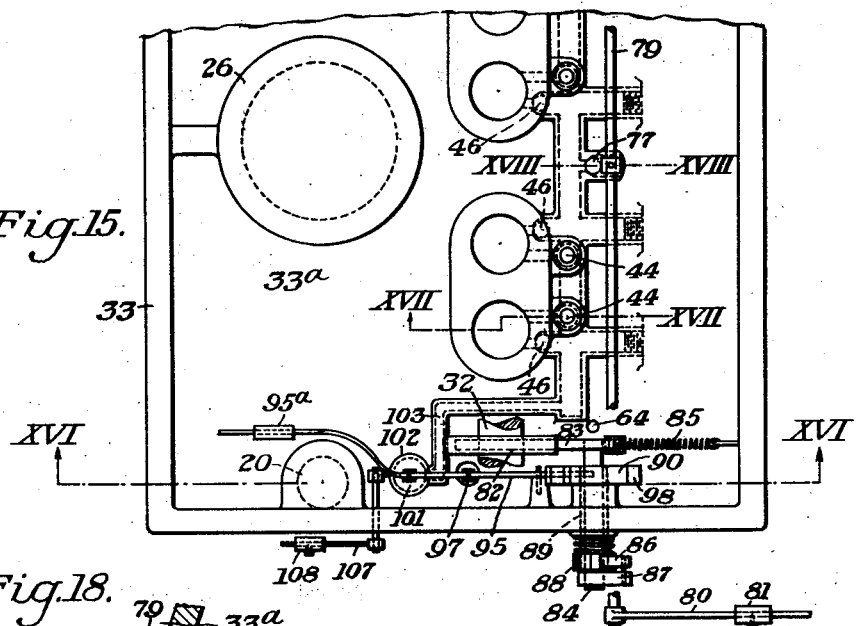
Figure 18:
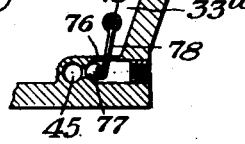
Figure 17:
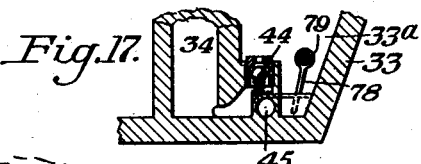
Figure 16:
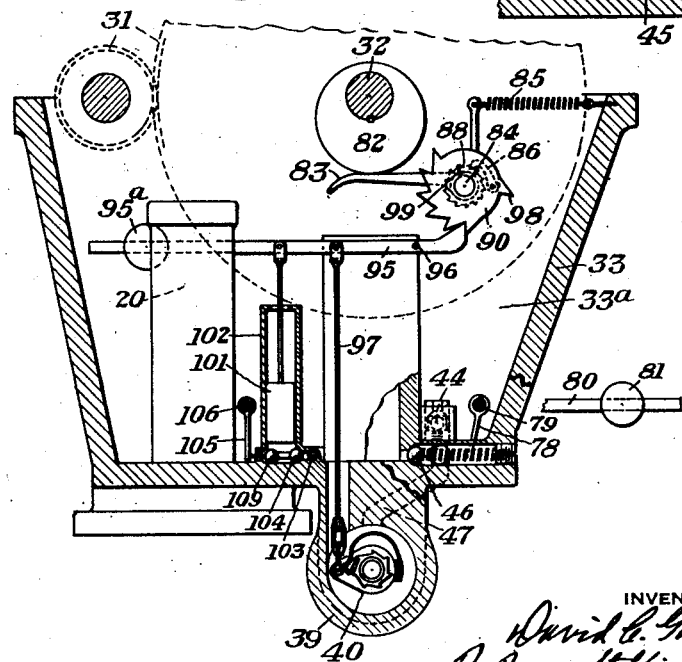
Figure 19:
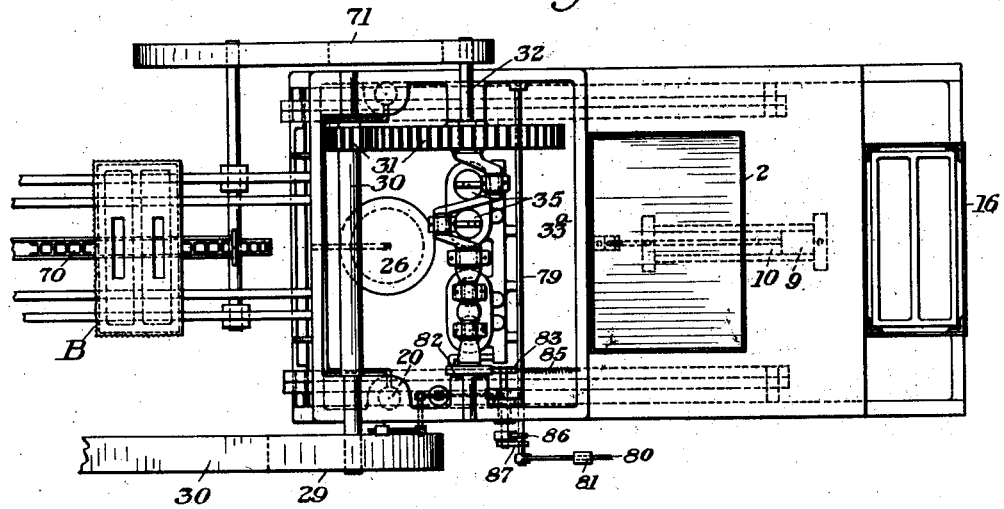
Figure 20:
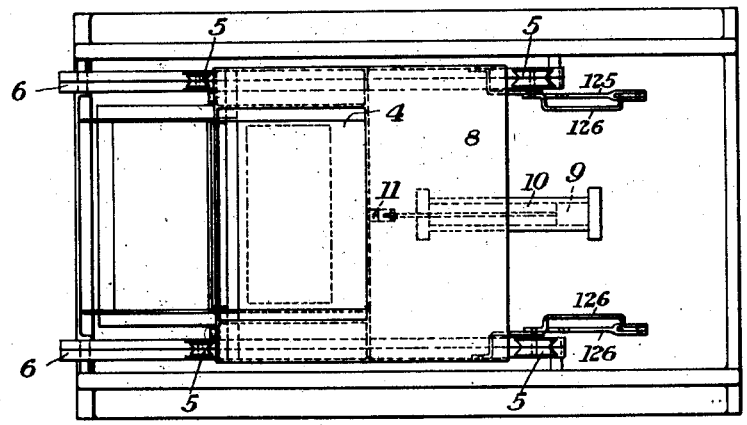
Figure 24:
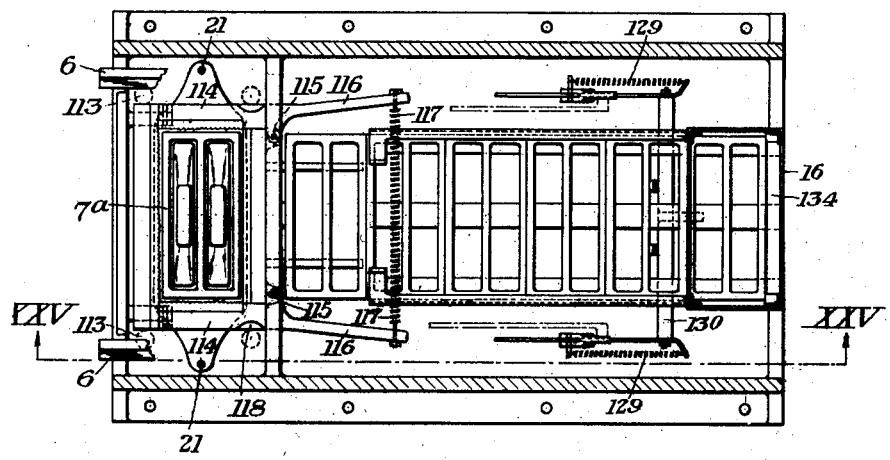
Figure 25:
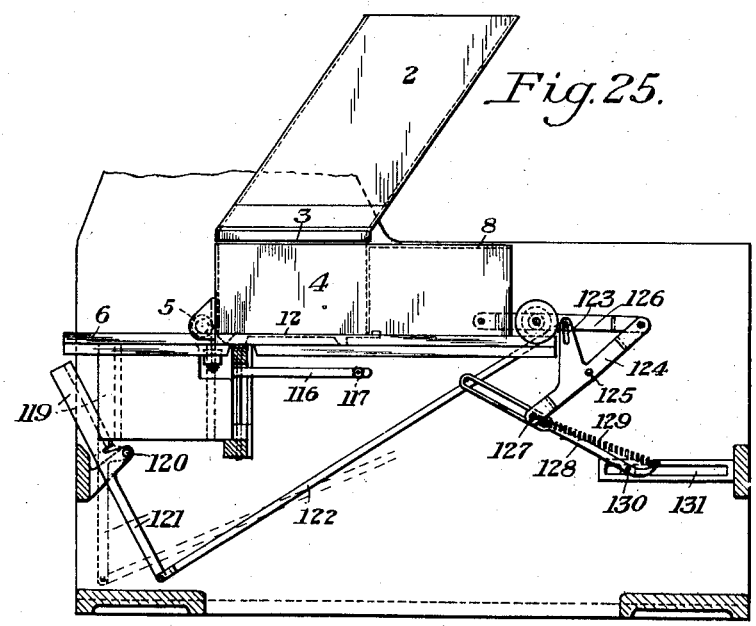
Figure 26:
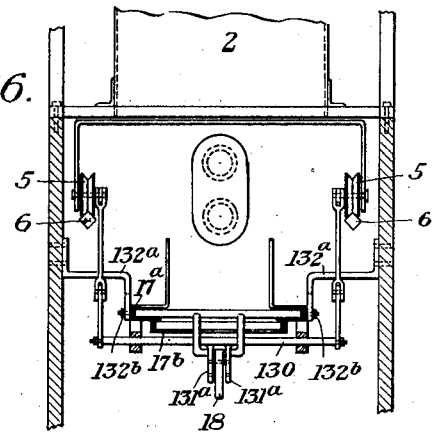
Figure 27:
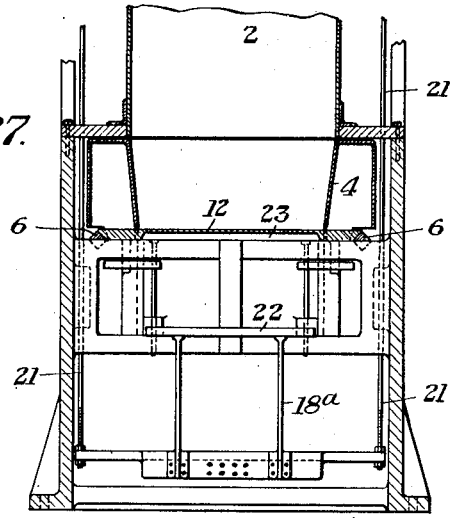
Figure 28:
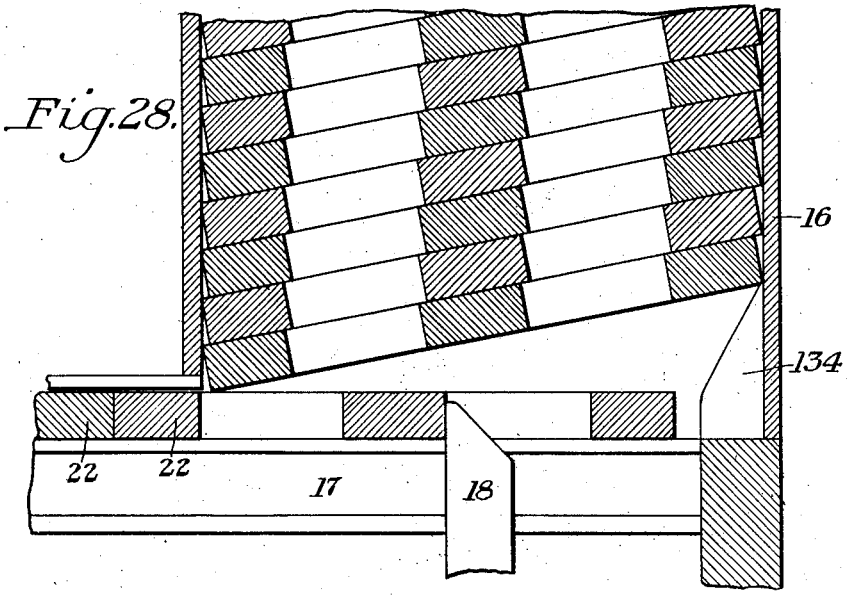
Figure 29:
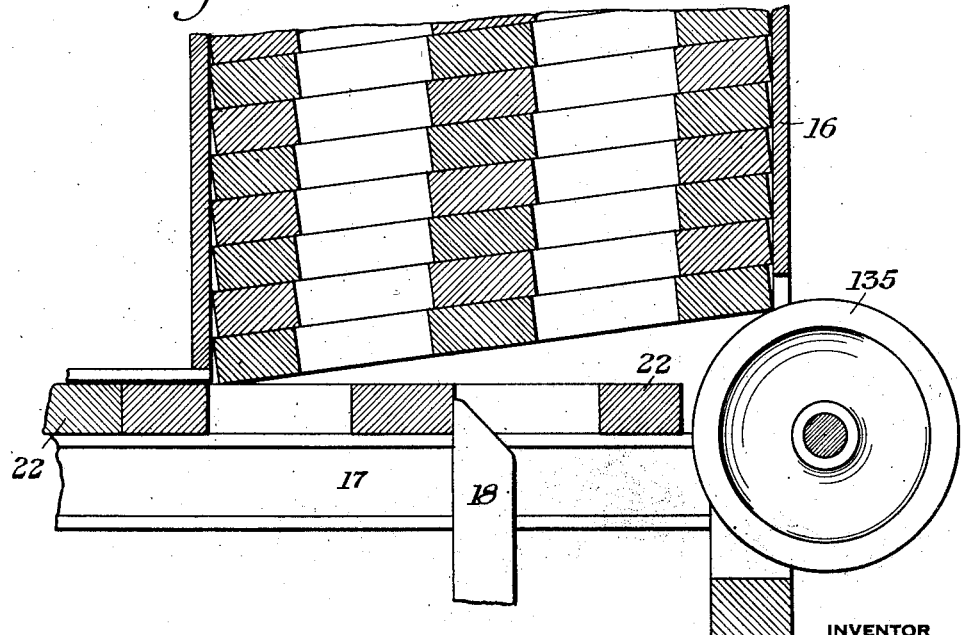

Figures 5, 6, and 7 are sections on the lines V—V, VI—VI and VII—VII, respectively, of Figure 3;

Figures 8 to 14, inclusive, are diagrammatic views corresponding to a portion of Figure 2 and showing the various steps in the operation of my machine and the corresponding positions of the control valve;

Figure 15 is a horizontal section, partly broken away, taken on the line XV—XV of Figure 2 and showing the arrangement of oil pumps and cylinders in the upper portion of the machine;

Figure 16 is a vertical section, partly broken away, on the line XVI—XVI of Figure 15;

Figure 17 is a vertical section taken on the line XVII—XVII of Figure 15, showing the inlet valve for one of the oil pump cylinders;

Figure 18 is a section on the line XVIII—XVIII of Figure 15, showing the safety valve employed;

Figure 19 is a top plan view of the machine with the top cover removed;

Figure 20 is a sectional plan view of a portion of the machine, the section being taken on the line XX—XX of Figure 2;

Figure 21 is an end elevation of the machine;

Figure 22 is a perspective view of the feed box;

Figure 23 is a perspective view showing the slidable bottom for the feed box;

Figure 24 is a horizontal section taken on the line XXIV—XXIV of Figure 2;

Figure 25 is a vertical section on the line XXV—XXV of Figure 24;

Figure 26 is a vertical section on the line XXVI—XXVI of Figure 2;

Figure 27 is a vertical section on the line XXVII—XXVII of Figure 2;

Figures 28 and 29 are vertical sections through two forms of pallet feed box employed in connection with my invention;

Figure 30 is a top plan view of the ram used for compacting the material;

Figure 31 is a vertical section on the line XXXI—XXXI of Figure 30;

Figure 32 is a section on the line XXXII—XXXII of Figure 31, and

Figure 33 is a detail view of a portion of the conveyor.

In the illustrated embodiment of the invention, there is shown an inclined chute 2 adapted to be connected with any suitable hopper or other source of material to be compressed into blocks, terminating in a substantially horizontal bottom outlet 3. The outlet 3 is positioned immediately above a feed box 4, as shown in Figure 2. The feed box 4 is supported by rollers 5 on tracks 6 for reciprocation between the position shown in Figure 2 and a position immediately above a mold chamber 7 in which the block is to be compressed.

The feed box when in the position shown in Figure 2 is filled with material from the chute 2 so that as it moves into position above the mold chamber, it carries a definite quantity of material to be compressed. The feed box is provided with an integral extension 8 which serves to close the opening 3 when the feed box is in its forward position.

Reciprocation of the feed box 4 is effected by a piston 9 working in an oil cylinder 10 and connected to the feed box 4 by a pin connection 11 which allows sufficient flexibility to take care of misalignment caused by construction or operation and serving to allow freedom of operation at all times. The feed box 4 is provided with a slidable bottom 12 actuated by a piston 13 working in an oil cylinder 14 and flexibly connected to the bottom by a pin connection 15.

Pallets are supplied to the machine from a hopper 16 from which they are fed along guides 17 by a reciprocable dog 18 operated as hereinafter set forth. The pallets are fed from the guides 17 to a vertically reciprocable lifter 18$^a$ actuated by plungers 19 working in oil cylinders 20 and connected to the lifter by rods 21. The lifter 18$^a$ is effective for raising a pallet 22 into a recess 23 in the under side of the slidable feed box bottom 12 with which it is moved into position over the mold chamber 7.

The lifter 18$^a$ is secured to a plate 18$^b$ adjustably mounted on the screw-threaded lower ends of the rods 21 and rising from this plate are vertical pallet posts 24 adapted to be moved from the position shown in Figure 2 upwardly into the mold chamber 7 as the plungers 19 are operated, so that as the feed box and its bottom are advanced into position over the mold chamber, the pallet 22 is supported by the posts 24 until the plungers 19 are again lowered.

The lowering of the plungers 19 is effective for carrying the pallet to the bottom portion of the mold chamber 7. Thereafter the feed box bottom 12 is retracted by the actuating piston 13 and the material from the feed box 4 drops into the mold chamber. A piston 25 working in a cylinder 26 and connected to a ram 27 is then moved downwardly to compress the block, after which the feed box is retracted to the position shown in Figure 2, at which time a knife edge 28 at the lower edge of the front side of the feed box is effective for trimming off the top of the block and carrying the excess material back with it for use in the succeeding block.

From the above the sequence of operations will be seen in a general way, but these will be more fully described hereinafter. The automatically operated control valve and its operating means will next be described. Referring to Figures 1, 2 and 19, there is shown a belt driven fly-wheel 29 carried by a pinion shaft 30 which is connected by gears 31 to a crank shaft 32. These shafts are carried by a reservoir casting 33 in which are formed the cylinders 20 and 26 and also a plurality of pump cylinders 34 in which are operated pistons 35 connected to the crank shaft 32 by connecting rods 36. Attached to the lower portion of the reservoir 33 is the control valve 37, shown in Figures 3 to 7 inclusive.

The valve 37 comprises a tapering valve member 38 mounted in a suitable housing 39 and adapted to be rotated in step-by-step manner by a ratchet mechanism indicated generally by the reference numeral 40. The valve member 38 is provided with suitable bearings 41 and a bolt 41ᵃ carried by a removable closure 41ᵇ for one end of the housing 39 serves to take care of end thrust and to keep the valve to a proper fit with its seat. A shaft 42 is connected to the other end of the valve member and extends through a packed bearing in a removable closure 42ᵃ for the other end of the housing 39. This shaft carries a pointer 43 for indicating the setting of the valve.

The pump cylinders 34 draw oil or other suitable operating fluid from the reservoir 33ᵃ through ball check valves 44 (Figures 15 and 17) and deliver oil under pressure to a channel 45 through ball check valves 46. The channel 45 connects all of the oil cylinders with the main operating valve 37 through a passage 47 which terminates in an annular passage 48 surrounding the valve member 38. Drilled in the valve member 38 is a suitable passage 49 communicating at all times with the annular passage 48 and having outlets 50, 50ᵃ and 51 adapted to communicate with ports leading to the various oil cylinders. There is also provided a passage 52 placed diametrically opposite the passage 49 and terminating in an outlet 53, this latter being preferably placed substantially opposite the ports 50ᵃ and 51 in order to balance the pressure conditions on the two sides of the valve and thus make it easier to operate.

A central bore 54 is provided in the valve member 38 for returning exhaust fluid from the various cylinders to the reservoir 33ᵃ. The passage 54 is provided with outlets 55, 56, 57, 58, 59, 60 and 61 adapted to successively connect the various fluid cylinders of the apparatus with the reservoir to provide a suitable exhaust line, as hereinafter set forth. The returning oil escapes from the passage 54 through outlets 62, leading to an annular space 63 around the stem of the valve member 38, from which the oil flows back to the reservoir through a suitable passage 64.

Referring now to Figures 8 to 14, inclusive, there is shown in diagrammatic form the operation of the machine and the position of the valve member 38 corresponding to each operation.

Figure 8:
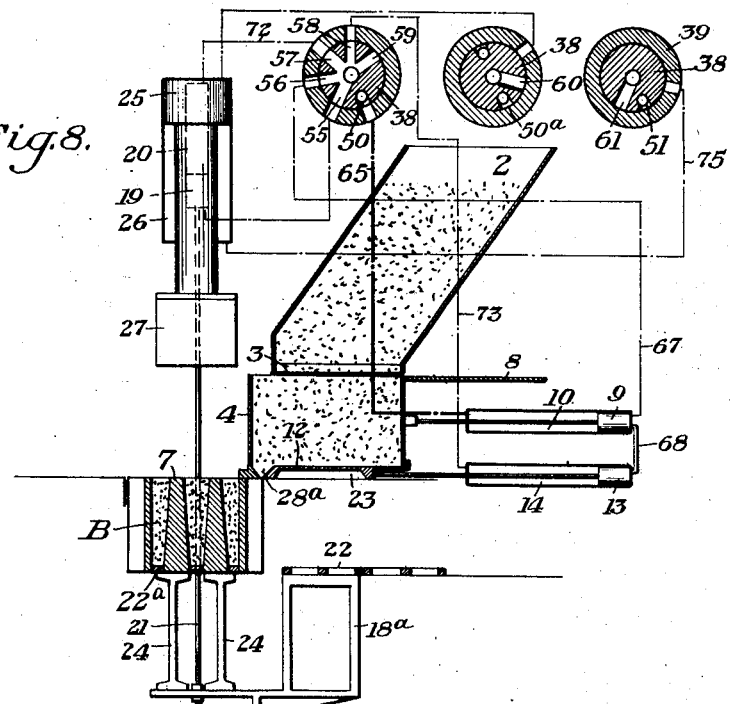

Commencing with Figure 8 there is shown a completed block B carried by a pallet 22ᵃ in the mold chamber 7 of the machine. The feed box 4 is in retracted position and has been filled with material from the chute 2. It will be noted that the left hand end of the cylinder 10 is operatively connected with the pressure line 65 through the port 50 by a fluid line 65 indicated by a heavy chain line to show that a pressure condition is existing therein. Throughout these diagrams lines in which a pressure condition exists are shown heavy, while the remaining fluid lines are indicated by a light chain line.

Figure 9:
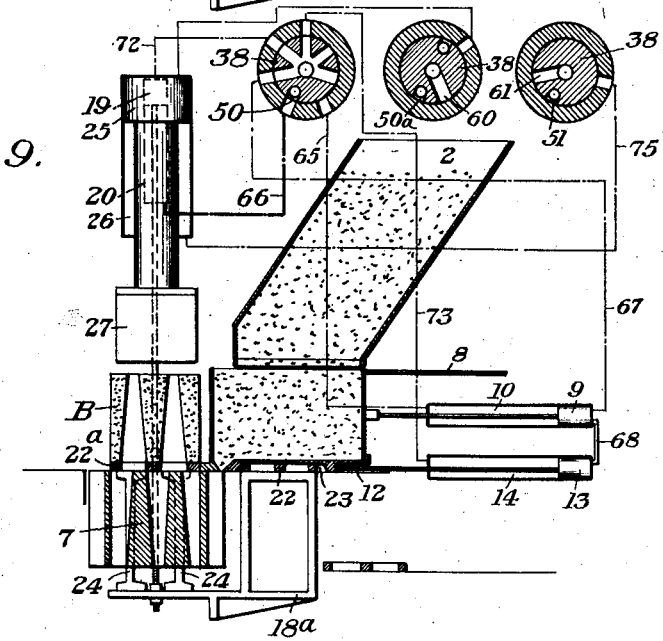

Figure 8 illustrates the condition which exists just after a block has been compressed and the feed box 4 retracted, cutting off the top of the block and leaving it in the mold in finished form. As shown in Figure 9, the valve member 38 is advanced clockwise one step so that the pressure port 50 communicates with a fluid line 66 leading to the lower ends of the cylinders 20 and effective to raise the plungers 19 to top position. When this occurs the lifter 18ᵃ moves the pallet 22 into the recess 23 in the slidable feed box bottom 12 and also moves the posts 24 upwardly, thus raising the pallet 22ᵃ with the block B thereon above the top of the mold 7.

Figure 10:
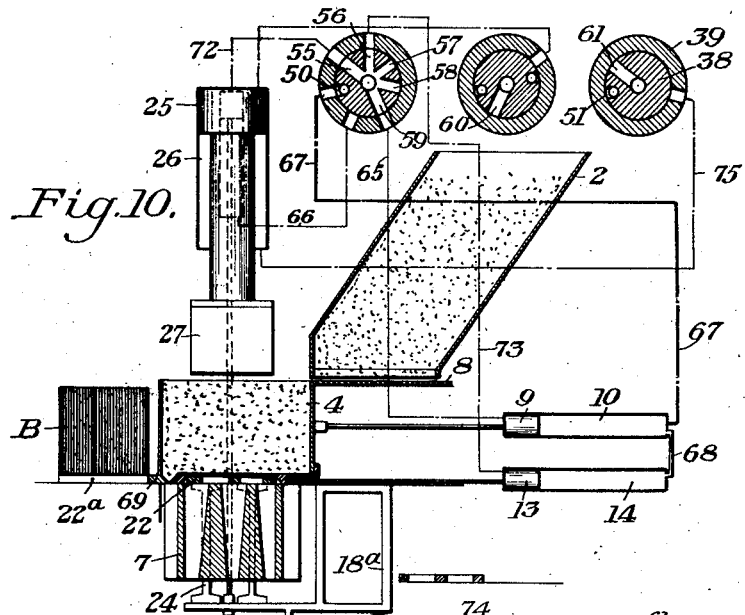

Figure 10 shows the valve member 38 advanced one step further so that the pressure port 50 communicates with a fluid pressure line 67, terminating in the right hand end of the cylinder 10. This end of the cylinder 10 is connected by a passage 68 of relatively large area to the right hand end of cylinder 14 so that the oil pressure is admitted to the two cylinders 10 and 14 practically simultaneously. This is effective for moving the feed box 4 into advanced position over the mold 7, this operation also moving the extension 8 into position to close the opening 3 to prevent any flow of material from the chute 2. At the same time the pallet 22 is carried forward and positioned upon the posts 24, while a projecting ledge 69 bears against the block-supporting pallet 22ᵃ and moves the block B onto a suitable conveyor 70 driven from the crank shaft 32 by a belt 71. In this manner the block is transferred to the conveyor for automatic removal from the machine to any desired point without its being touched in any manner, so that blocks which are to be baked or otherwise subsequently treated are delivered in perfect condition.

Figure 11:
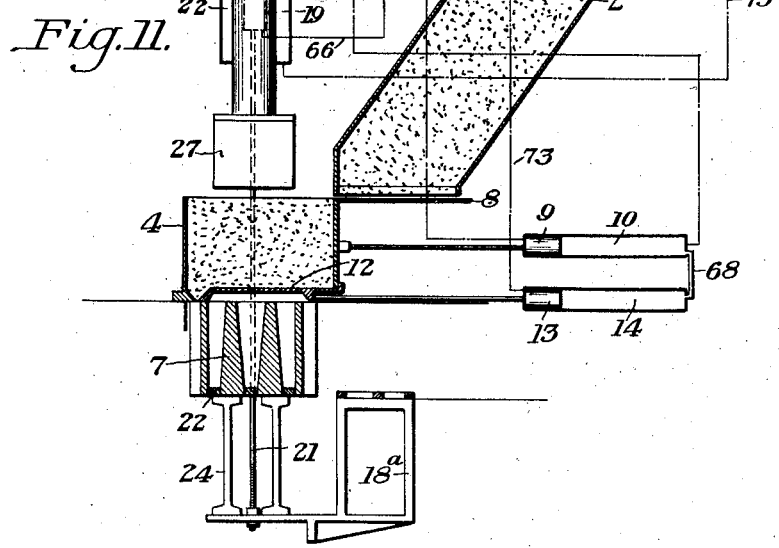

Figure 11 shows the valve member 38 advanced one step further so that the pressure port 50 is connected with a pressure line 72 terminating in the upper end of the cylinder 20 and effective for moving the lifter 18ᵃ and the posts 24 to bottom position. As the posts 24 are lowered they carry with them the pallet 22 so that at the end of the stroke it is located at the bottom of the mold chamber 7.

Figure 12:
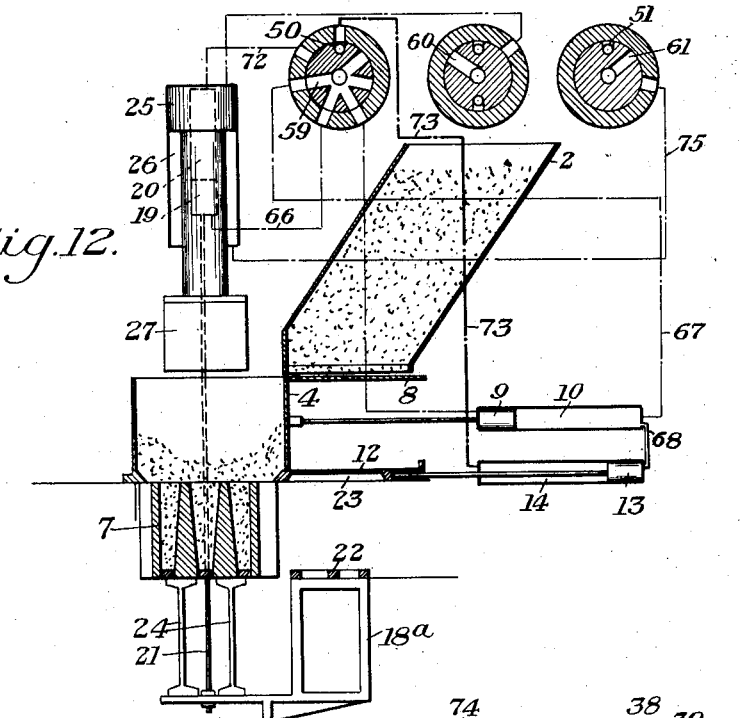

Figure 12 shows the next step in the cycle of operations, the valve member 38 being again advanced so that the pressure port 50 is connected to a fluid pressure line 73 communicating with the left hand end of the cylinder 14 and effective for moving the piston 13 and connected feed box bottom 12 to retracted position. The feed box 4 remains in its advanced position and is not moved back by friction between the feed box bottom 12 and the feed box because of the relative area of the passage 68 and the fluid line 67 which is now connected to the exhaust outlet 59. The passage 68 being considerably larger than the fluid line 67, the oil exhausted from the right hand portion of the cylinder 14 is effective for maintaining a certain pressure in the cylinder 10 which resists any tendency on the part of the feed box 4 to return to retracted position. As the feed box bottom 12 is moved back to the position shown in Figure 12 the material in the feed box is discharged into the mold chamber 7 in a very uniform manner. It will be seen that all parts of the mold receive uniform quantities of material falling from a uniform height, which would not be the case if a charge of material were pushed forward from one side of the mold chamber by a plate or similar device. By the herein described method of feeding material to the mold, blocks of uniform density throughout are secured, since the uncompressed material is of substantially uniform density throughout the mold chamber, and is also of substantially uniform depth throughout said chamber when no cores are used. These ideal conditions are somewhat affected by the presence of cores in the mold, this, however, being compensated for as hereinafter described.

Figure 13:
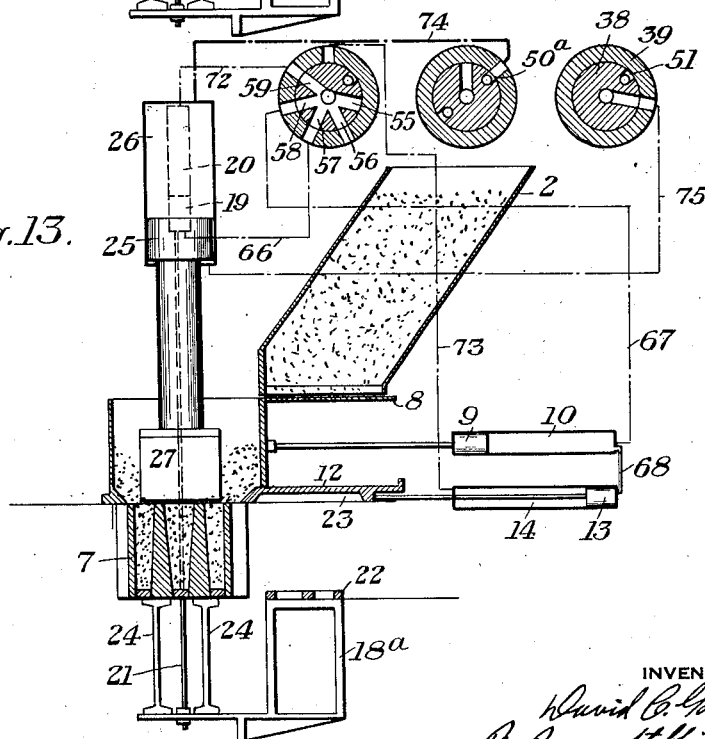

Figure 13 shows the next step in the cycle of operations, the valve member 38 being advanced until the pressure port 50ª is connected with a fluid pressure line 74 communicating with the upper end of the cylinder 26 and effective for driving the piston 25 and connected ram 27 downwardly onto the material in the mold 7. The material is thus compressed into a block and the ram 27 is retracted by advancing the valve member 38 one step further, so that the port 51 is in communication with a fluid line 75 connected to the lower end of the cylinder 26. This places the various parts of the apparatus in the position shown in Figure 14 and the next step is the admission of pressure to the left hand end of the cylinder 10, as shown in Figure 8, so as to retract the feed box 4 and cut off the finished block to proper height, leaving it ready for delivery as above described.

As previously explained, the feed box is provided at the lower edge of its front side with a knife edge 28 for trimming off the top of the compressed block as the feed box is retracted. The slidable feed box bottom 12 is provided at its forward edge with a cooperating knife edge 28ª, so that as the feed box is retracted, the material removed by the knife edge 28 from the top of the block is lifted back into the box by the cooperating knife edges 28 and 28ª. If these edges presented vertical shoulders instead of knife edges, material would be liable to be caught between such edges and prevent the feed box from being fully retracted. It has heretofore been proposed to utilize an edge of a reciprocating feed box to remove surplus material from the upper end of a compressed block, but this has been unsatisfactory because this manner of removing the surplus material often resulted in leaving the upper end of the compressed block with a rough and uneven surface. I have overcome this difficulty by employing a knife edge on the reciprocating feed box for removing the surplus material from the upper end of the block.

By following through the diagrams just described, it will be seen that the ports 55 to 61 are so placed as to cut off the cylinders from the exhaust and thereby hold the various pistons in the desired positions during certain of the steps, as is obviously desirable in a machine of this character, and to thereafter provide free communication with the exhaust, so that the pistons may be operated in the proper sequence.

The oil pumps and valve timing apparatus are shown in detail in Figures 15 to 19, inclusive. As before described, oil pressure is supplied by the pump pistons 35 driven from the crank shaft 32, each of which has a valve-controlled outlet in the passage 45. I preferably use a plurality of pump cylinders, there being four in the illustrated embodiment of the invention, since this materially reduces the load on the crank shaft and crank shaft bearings and also supplies oil at such a uniform rate that I have found that the usual air bell or other pressure equalizer may be dispensed with. In order to definitely set the pressure at which the machine operates and thus determine exactly the pressure which will be exerted in compacting the material in the mold, there is provided an outlet 76 from the passage 45 to the reservoir 33ª, which passage is normally closed by a relief valve 77. This valve consists of a ball pressed against its seat by a finger 78, which finger is carried on a shaft 79 provided with a lever arm 80 having a weight 81 slidably mounted thereon. By moving the weight along the arm 80, any desired pressure may be exerted against the ball valve, thus effectively determining the pressure at which the apparatus is to work. If the pumps supply oil to the passage 45 in excess of the quantity which will produce the desired pressure, the ball is forced away from its seat and the excess oil is returned to the reservoir 33ª.

Mounted on the crank shaft 32 is an eccentric 82 having a follower 83 mounted on a shaft 84 and provided with a tension spring 85 effective for holding the follower 83 in contact with the eccentric at all times. As the crank shaft is rotated, the eccentric causes the shaft 84 to reciprocate and this motion is communicated to a pawl 86 connected to the shaft 84 by an arm 87 and effective for advancing a ratchet 88 in a step-by-step manner. The ratchet 88 is secured to a sleeve 89 which surrounds the shaft 84 and carries a cam 90. This cam has seven teeth which correspond to the steps in the operation of the machine illustrated diagrammatically in Figures 8 to 14, each tooth being effective for advancing the valve member 38 one step. The cam 90 is provided with a follower 95 pivoted at 96 and having a rod 97 connected to the pawl and ratchet 40. Each time the follower 95 is moved by the cam 90 it is effective for advancing the valve member 38 one step. As seen in Figure 16, the teeth on the cam 90 are non-uniformly spaced, there being one tooth 98 which is widely separated from the other six teeth. This tooth 98 is the one which advances the valve from the position of Figure 13 to the position of Figure 14, and it will be apparent that this spacing provides an extended period of time for the compacting operation shown in Figure 13 and for the return of the ram 27, as shown in Figure 14. In each of these cases there is considerable load on the machine and these operations are preferably carried out slowly. In all the other steps the parts to be moved are relatively light and may be moved far more rapidly so that the non-uniform spacing of the teeth on the cam makes for increased production of the machine.

By disengaging the pawl 86 from the ratchet 88 the machine may be thrown out of operation without stopping the pumps and it may be re-started at any time by re-engaging the pawl and ratchet. In order to insure correct timing when this is done, one of the teeth on the ratchet 88 is preferably distinctively marked as indicated at 99 in Figure 16. The valve member 38 may be turned by applying a wrench to a squared portion 100 on the extending shaft 42 (Figure 3) until the pointer 43 indicates one of the valve position numerals in Figure 4. For example, the mark 99 on the ratchet may be placed on such a tooth that the pawl should engage that particular tooth when the pointer is at the numeral 1, thus immediately setting the valve in its proper position.

The machine may also be thrown out of operation by raising the weighted arm 80 until it is engaged by a shoulder 80$^a$ on a detent lever 80$^b$ (Figure 1). In this case the pump simply sucks in oil and pumps it right back into the reservoir 33$^a$ past the valve 77 without having any effect on the various operating cylinders.

While the safety valve generally is effective for preventing overloading of the machine, I provide an additional safety means as shown in Figure 16. This comprises a piston 101 attached to the cam follower arm 95 and working in a cylinder 102. This cylinder is connected to the pressure channel 45 by a conduit 103 but this passage is normally held closed by a check valve 104 held against its seal by a finger 105 attached to a shaft 106 and having an arm 107 and adjustable counterweight 108 thereon. The stem of the valve 104 is provided with a second valve 109 so related to the first valve that when one of them is opened the other is closed. If the oil pressure rises too high, as would generally take place in the compressing operation, the valve 104 is forced open, thus closing the valve 109 and permitting fluid under pressure to flow into the lower end of the cylinder 102. This causes the piston 101 to rise and is effective for advancing the valve member 38 one step, thus continuing the operation of the machine without breakage of the parts. When the valve member is advanced in this manner to connect an operating cylinder with the pressure line, the pressure in the conduit is immediately reduced to such an extent that the weighted arm 107 is enabled to close the valve 104. The piston 101 can then descend under the action of gravity assisted by a weight 95$^a$ on an extension of the follower 95 (Figure 15). The piston 101 is then again in position to advance the valve another step in case the pressure again rises too high. In other words, if the cam 90 should, for any reason, fail to function, the piston 101 will function to automatically advance the valve member 38 step-by-step.

The feed box 4 and its slidable bottom 12 are shown in more detail in Figures 20 to 23, inclusive. Referring to these figures, it will be seen that the rollers 5 are grooved and operate on square guide bars 6 secured on edge to the side frames of the machine. The bottom slide 12 is not provided with rollers but its edges are beveled and it lies between the guides 6 and is slidable thereon. The bottom slide 12 is provided with two forwardly extending strips 110 and corresponding slots 111 are provided in the forward end of the feed box 4. These strips are effective for preventing any leakage of material around the sides of the feed box when the slidable bottom 12 is moved to retracted position as at that time they form a continuation of the side walls 112 of the feed box.

It will be noted in Figure 22 that the feed box is further provided with a pair of rollers 113 and the purpose of these is clearly shown in Figure 24. It will be apparent that if it is desired to produce a building block which is smooth on all its faces, the block may be ejected from the mold chamber without opening the sides of the same, but that if it is desired to produce a block having figured sides, such as those which are made to represent stones, some provision must be made for opening the sides of the mold chamber. Referring to Figure 24, it will be seen that the mold chamber 7ª is provided with a pair of end plates 114 pivoted at 115 and having rearwardly projecting arms 116 normally urged together by a tension spring 117. When the feed box is in retracted position the rollers lie adjacent to depressions 118 in the side portions 114 and the spring 117 is therefore free to open up the sides of the mold chamber for ejectment of a finished block. However, when the feed box is in its forward position, the rollers occupy the position shown in dotted lines in Figure 24 and are effective for closing and maintaining closed the end portions 114.

Referring to Figure 25 it will be seen that the mold chamber is also provided with a front side wall 119 pivoted at 120 and having downwardly extending arms 121. The lower ends of these arms are connected by links 122 with a pair of levers 124 pivoted at 125, said links having pins engaging in slots 123 in said levers. These levers are connected to the feed box 4 by links 126 whereby the levers are reciprocated on every stroke of the feed box. It will be seen that when the feed box is forward the links 122 will be effective for holding the pivoted side 119 in operative position, while on the return stroke it will be moved outwardly to permit removal of a block. When smooth blocks are being made the links 122 are disconnected and the apparatus is operated without this feature.

The lower end of each of the levers 124 carries a pin 127 working in a slot in an arm 128. A spring 129 connects each pin with the rear end of one of said arms. Each of the arms 128 is pivoted to an end of a cross bar 130 working in slots in horizontal guides 131, so that as the feed box 4 is reciprocated the cross bar 130 is also horizontally reciprocated. It is intended that the springs 129 should be effective for moving the arms to the left, as viewed in Figure 25, so the springs are placed under initial tension.

The cross bar 130 is provided with downwardly extending portions 131ª between which is pivoted the dog 18 used for advancing the pallets. It will thus be seen that as the feed box is reciprocated, the mechanism just described is effective for feeding pallets forwardly in the guides 17. As the feed box is advanced, the cross bar is moved rearwardly and the dog 18 is positioned with its upper end behind one of the cross bars of the pallet which is in the rear end of the guides 17 (Figures 28 and 29). When the feed box is retracted, the dog engages and advances this pallet and all of the pallets in front of it, so that the pallet at the front end of the guides 17 is shoved off on to the pallet lifter 18ª (Figure 2). In the event that a pallet should become jammed, the pins 127 merely move in the slots of the arms 128 and further expand the springs 129 without injury to any of the parts of the apparatus.

Referring to Figures 2 and 26, it will be seen that the guides 17 are really made up of guides 17ª for wide pallets and 17ᵇ for narrow pallets. The guide frame is pivoted at its rear end at 132 and near its forward end is adjustably supported by brackets 132ª having slots through which pins carried by the frame extend, these pins being threaded and engaged by nuts 132ᵇ. When blocks of less depth than the depth of the mold chamber are to be made, the plate 18ᵇ may be adjusted on the screw-threaded ends of the rods 21 to elevate the pallet posts 24. This will result in correspondingly elevating the pallet lifter 18ª, and hence the forward end of the guide frame must be correspondingly elevated. This is accomplished by loosening the nuts 132ᵇ and raising the forward end of the guide frame the desired amount and then tightening the nuts to hold the frame in its adjusted position. It is also necessary to adjust the guide frame in this manner when the guides 17ᵇ are used instead of the guides 17ª, or vice versa. The downwardly extending portions 131 have two pairs of aligned openings therein to receive the pivot pin of the dog 18. When the guides 17ª are used, the pivot pin of the dog is located in the upper pair of openings, and when the guides 17ᵇ are used, it is located in the lower pair of openings.

Pallets are supplied to the hopper 16 in a pallet transfer box 133 adapted to fit into the upper end of the hopper. The pallets may be conveniently handled by placing the lowermost pallet in the transfer box 133 crosswise, as shown in Figure 2, so that the pallets are entirely supported in this transfer box until the latter has been placed in position over the hopper. At that time the crosswise pallet may be pulled out, thus allowing the remaining pallets to drop into the hopper. Any suitable number of pallet transfer boxes may be provided and each such box may have a bail 133ª adapted to engage a hook 133ᵇ on a cross bar of the conveyor chain 70 (Figures 2 and 33). As has already been stated, this conveyor may lead to any convenient point. As the molded blocks are taken off of the conveyor, the pallets may be removed from the same and placed in an empty pallet transfer box. When this box is filled with pallets, its bail may be engaged with a hook 133ᵇ, and the conveyor will then carry the pallet transfer box back to the molding machine. When the transfer box engages the standards 133ᶜ which support the rear end of the conveyor, the movement of the transfer box will be arrested and its bail will be automatically disengaged from the hook 133ᵇ, whereupon the transfer box will drop to the floor. This manner of returning the pallets to the machine will obviously save labor and time.

In order to reduce the load on the pallet feeding mechanism, means may be provided for maintaining the pallets in the hopper partially out of contact with the bottom pallet therein, so as to reduce the friction load thereof and make it easy to feed. As shown in Figures 2 and 28, this is accomplished by providing a tapered block 134 in the bottom portion of the hopper 16, so that the pallets are laid in a slightly inclined position in the hopper, and only make contact with the bottom pallet at one edge thereof. In this manner the load on the dog 18, when the latter moves forwardly to advance the pallets in the guides 17, is very materially lessened. As shown in Figure 29, a roller 135 may be substituted for the tapered block 134.

It has been pointed out that the presence of the cores in the mold chamber disturbs the uniform depth and density of the material as fed to the mold chamber, particularly where tapered cores, such as illustrated, are employed, and it is therefore, desirable to provide compensating means for insuring the production of blocks of uniform density. This is accomplished by providing yielding portions in the ram 27, as shown in Figures 30 to 32, inclusive, to compress the material immediately adjacent the cores. The ram 27 comprises a body 136 of a size corresponding to that of the mold chamber and having a compartment 137 therein for each core in the mold chamber. These compartments are separated by a partition wall 137ª which comes opposite the space between the cores. There is placed in each of these compartments a block 138 which may be solid or which may have an opening 139 therein to receive a core. The blocks are slidably held in the compartments by bolts 140 and are normally urged downwardly by heavy compression springs 141. It will be seen that as the ram is moved downwardly under pressure, the blocks 138 may move upwardly within the ram against the springs 141 and thus exert less pressure on the material adjacent the cores than is exerted on the remaining portions of the material by the rigid walls of the ram surrounding the compartments and the upper ends of the cores may even project into the openings 139. The ram thus tends to exert pressure on the different portions of the material in the mold chamber proportionate to the depth of said portions, and thereby produce a block of uniform density throughout. Yielding portions may be desirable in the ram, even where cores are not employed in the mold chamber, as when it is desired to produce a block having certain portions denser than other portions. In order to prevent the material from getting inside the compartments when the blocks 138 are provided with openings, there may be provided a sheet of flexible material 142, such as sheet rubber, which effectively closes off the interior of the ram while permitting movement of the blocks 138 to the required degree and permitting the upper ends of the cores to project into the openings 139 by stretching the rubber diaphragm 142. As shown in Figures 31 and 32, all metal corners adjacent the rubber should be carefully rounded off to insure long life. The rubber diaphragm is clamped between the lower lower edges of the body 136 and strips 136ª secured to the body by screws 136ᵇ. The diaphragm extends over the outer faces of the blocks 138 and is clamped between said faces and plates 138ª which have openings 139ª therein opposite the openings 139. The plates are held to the blocks by the bolts 140.

The advantages arising from my invention will be apparent from the foregoing description. It will be seen that I have provided a molding machine which, once put in operation, is entirely automatic, the various steps in the manufacture of a compressed block taking place in proper sequence and at suitable time intervals. The material and the pallets are automatically fed to the mold chamber and the finished blocks are carried away without requiring any handling on the part of operatives. The machine does not require skilled labor for its operation, but may be operated by unskilled labor with nothing more than ordinary supervision. All of the various movements of the machine are produced either through fluid pressure means or springs, so that there are no absolutely unyielding parts. This is a highly desirable feature in a machine of this character where the possibilities of gravel or other material getting into the working parts and causing a jam is always present. In case the movement of one of the parts, such as the ram, is hindered or prevented, the fluid pressure simply builds up in the pressure fluid line until such pressure is relieved by the opening of the relief valve 77, or by the opening of the auxiliary relief valve 104, thus permitting the plunger 101 to be raised and the main control valve advanced to another position. The product is a block of uniform density throughout, molded to excess size and then cut down to size after the compacting is completed, the material thus removed being utilized for the succeeding block. Each block is automatically provided with a pallet, and each finished block is ejected from the machine by means which contacts only with its pallet, so that the blocks are not injured or marred in any manner in being removed from the machine.

While I have shown and described a preferred embodiment of my invention, it will be understood that changes may be made in the construction and operation disclosed without departing from the spirit of the invention or scope of the appended claims.

I claim:

1. A molding machine including a source of material to be molded, a mold chamber, a movable feed box adapted to transfer material from the source to the mold chamber and having a movable closure, means for relatively moving the feed box and mold chamber to bring the feed box into cooperative position with relation to the mold chamber, and means for opening the closure to permit transfer of the material from the feed box to the mold chamber, substantially as described.

2. A molding machine including a source of material to be molded, a mold chamber, a reciprocable feed box adapted to transfer material from the source to the mold chamber and having a reciprocable bottom adapted to be moved with the feed box or moved relative thereto, means for moving the feed box with its bottom from the source of material into position over the mold chamber, and means for moving the feed box bottom to permit transfer of the material from the feed box to the mold chamber, substantially as described.

3. A molding machine including a source of material to be molded, a mold chamber, a reciprocable feed box adapted to receive material from the source and to be advanced into position over the mold chamber and having a separable bottom, means for moving the feed box with its bottom into position above the mold chamber, and means for retracting the bottom to permit transfer of the material from the feed box to the mold chamber, substantially as described.

4. A molding machine including a source of material to be molded, a mold chamber, a reciprocable feed box adapted to receive material from the source and to be advanced into position over the mold chamber and having a separable bottom, means for moving the feed box with its bottom into position above the mold chamber, means for retracting the bottom to permit transfer of the material from the feed box to the mold chamber, and means movable through the feed box for compacting the material in the mold chamber, substantially as described.

5. A molding machine including a mold chamber open at its upper end, a feed box having a slidable bottom closure, means for moving the box into and out of position over the chamber, and means for withdrawing said bottom closure after the box has been moved into position over the chamber, substantially as described.

6. A molding machine including a mold chamber open at its upper end, a feed box having a bottom closure, means for moving the box into and out of position over the chamber, means for opening the closure after the box has been moved into position over the chamber, and means for compacting the material deposited in the chamber, substantially as described.

7. A molding machine including a mold chamber open at its upper end, a feed box having a bottom closure, means for moving the box into and out of position over the chamber, means for opening the closure after the box has been moved into position over the chamber, and means movable through the box for compacting the material deposited in the chamber, substantially as described.

8. A molding machine including a mold chamber open at its upper end, a feed box movable into and out of position over the chamber and having a slidable bottom closure, means adapted to enter the chamber through the box for compacting the material deposited therein, and operating means effective to first move the box into position over the chamber, then withdraw the bottom closure, then actuate the compacting means, and finally withdraw the box, the box acting upon the return stroke thereof to effect removal of surplus material from the upper end of the molded article, substantially as described.

9. A molding machine including a mold chamber open at its upper end, a feed box having a bottom closure, means for moving the box into and out of position over the chamber, means for opening the closure after the box has been moved into position over the chamber, means for compacting the material deposited in the chamber, and means for ejecting the molded article from the chamber, substantially as described.

10. A molding machine including a mold chamber open at its upper end, a feed box having a bottom closure, means for moving the box into and out of position over the chamber, means for opening the closure after the box has been moved into position over the chamber, means for compacting the material deposited in the chamber, and means movable through the lower end of the chamber for ejecting the molded article therefrom, substantially as described.

11. A molding machine including a mold chamber open at its upper end, a feed box, means for depositing a pallet in the bottom of the chamber, means for moving the box into and out of position over the chamber, means for compacting the material deposited in the chamber, and means for raising the pallet with the molded article thereon into position to be moved laterally by said box when the same is again moved into position over the chamber, substantially as described.

12. A molding machine including a mold chamber open at its upper end, a feed box having a bottom closure, means for depositing a pallet in the bottom of the chamber, means for moving the box into and out of position over the chamber, means for opening the closure after the box has been moved into position over the chamber, means for compacting the material deposited in the chamber, and means for raising the pallet with the molded article thereon into position to be moved laterally by said box when the same is again moved into position over the chamber, substantially as described.

13. A molding machine including a mold chamber open at its upper end, a feed box having a bottom closure, means for depositing a pallet in the bottom of the chamber, means for moving the box into and out of position over the chamber, means for opening the closure after the box has been moved into position over the chamber, means for compacting the material deposited in the chamber, and means movable through the lower end of the chamber for raising the pallet with the molded article thereon into position to be moved laterally by the box when the same is again moved into position over said chamber, substantially as described.

14. A molding machine including a mold chamber open at its upper end, a feed box, means for depositing a pallet in the bottom of the chamber, means for moving the box into and out of position over the chamber, means for compacting the material deposited in the chamber, and means for raising the pallet with the molded article thereon into position to be moved laterally by the box when the same is again moved into position over the chamber, said box having a projecting portion for engagement with the pallet to thereby maintain the box out of contact with the molded article, substantially as described.

15. A molding machine including a stationary mold chamber open at its upper end, means for depositing a pallet in the bottom of the chamber through the open upper end thereof, means for depositing the material to be molded into the chamber through said upper end thereof, and plunger means for compacting the material deposited in the chamber, substantially as described.

16. A molding machine including a mold chamber open at its upper end, a feed box, means for depositing a pallet in the bottom of the chamber through the open upper end thereof, means for moving the feed box into and out of position over the chamber, and means for compacting the material deposited in the chamber, substantially as described.

17. A molding machine including a mold chamber open at its upper end, a feed box, a pallet feed mechanism, and means for moving the feed box into and out of position over the chamber, the pallet feed mechanism being connected to the box whereby movement of the latter actuates the mechanism, substantially as described.

18. A molding machine including a mold chamber open at its upper end, a feed box, a pallet feed mechanism, means or moving the feed box into and out of position over the chamber, the pallet feed mechanism being connected to the box whereby movement of the latter actuates the mechanism, and yielding means in such connection, substantially as described.

19. A molding machine including a mold chamber open at its upper end, a feed box having a bottom closure provided with a recess in the under side thereof, means for moving the box into and out of position over the chamber, means for positioning a pallet in the recess prior to the movement of the box into position over the chamber, and means for opening the closure after the box has been moved into position over the chamber, substantially as described.

20. A molding machine including a mold chamber open at its upper end, a feed box having a bottom closure provided with a recess in the under side thereof, means for moving the box into and out of position over the chamber, means for positioning a pallet in the recess prior to the movement of the box into position over the chamber, means for supporting the pallet as it is moved over the mold chamber and for lowering it to the bottom thereof, and means for opening the closure after the pallet has been moved to the bottom of the chamber, substantially as described.

21. A molding machine including a mold chamber open at its upper end, a feed box having a slidable bottom closure, means for moving the box into and out of position over the chamber, means for withdrawing the bottom closure after the box has been moved into position over the chamber, and means movable through the box when in position over the chamber for compacting the material deposited therein, the box having a knife edge at its lower end adapted to act as a scraper for removing surplus material from the upper end of the molded article as the box is withdrawn and to co-act with a knife edge on the bottom closure to lift such surplus material back into the box, substantially as described.

22. A molding machine comprising a mold chamber open at its upper end, and means for depositing pallets in said chamber through its upper end comprising a vertically movable pallet support associated with said chamber and pallet feed mechanism for depositing pallets on said support, substantially as described.

23. A molding machine comprising a mold chamber open at its upper end, a feed box movable into and out of position over said chamber, a vertically reciprocable pallet support associated with said chamber and adapted to raise a pallet into position to be moved by said box over said chamber, and pallet feed mechanism automatically actuated in timed relation to the movements of said box and of said support for depositing pallets on the latter, substantially as described.

24. A molding machine comprising a mold chamber open at its upper end, a feed box movable into and out of position over said chamber, said box being adapted to move a pallet into position over said chamber and permit the same to fall by gravity to the bottom thereof, and a vertically reciprocable pallet support associated with said chamber and adapted to raise a pallet with a molded article thereon out of said chamber and into position to be moved laterally by the box as the latter is moved into position over said chamber and simultaneously raise a pallet into position for said box to move the same over said chamber, substantially as described.

25. A molding machine comprising a mold chamber open at its upper end, a feed box movable into and out of position over said chamber, said box being adapted to move a pallet into position over said chamber and permit the same to fall by gravity to the bottom thereof, a vertically reciprocable pallet support associated with said chamber and adapted to raise a pallet with a molded article thereon out of said chamber and into position to be moved laterally by the box as the latter is moved into position over said chamber and simultaneously raise a pallet into position for said box to move the same over said chamber, and pallet feed mechanism automatically actuated in timed relation to the movements of said box and of said support for depositing pallets on the latter, substantially as described.

26. A molding machine comprising a mold chamber open at its upper end, a feed box having a slidable bottom closure, means for moving the box into and out of position over the chamber, and means for withdrawing the bottom closure after the box has been moved into position over the chamber, the box having a knife edge at its lower end adapted to act as scraper for removing surplus material from the upper end of the molded article as the box is withdrawn and to co-act with a knife edge on the bottom closure to lift such surplus material back into the box, substantially as described.

27. A molding machine including a mold chamber open at its upper end and having a side wall movable into and out of operative position, a feed box, means for moving the feed box into and out of position over the chamber, means for compacting the material deposited in the chamber, means for ejecting the molded article from the chamber, and means effective upon movement of the feed box into position over the chamber for moving said side wall into operative position and effective upon reverse movement of the feed box for moving said side wall into inoperative position, substantially as described.

28. A molding machine comprising a chute adapted to hold a supply of material to be molded and having a discharge opening at its lower end, a mold chamber below and offset laterally from said chute and open at its upper end, a feed box reciprocable between a position between the chute and a position over the mold chamber for transferring material from said chute to said chamber, said box having an extension forming a sliding closure for the discharge opening of the chute when the box is moved to a position over the mold chamber, and having a bottom closure adapted to be opened to permit the transfer of the material from the box to the mold chamber, substantially as described.

29. A molding machine including a mold chamber open at its upper end, a feed box having a movable bottom closure, fluid operated means for moving the box into and out of position over the chamber, fluid operated means for opening the closure after the box has been moved into position over the chamber, and an automatically operated valve for controlling the operation of both of the means in timed relation, substantially as described.

30. A molding machine including a mold chamber, a feed box having a movable bottom closure, a fluid cylinder having a piston therein operatively connected to the feed box for moving it into and out of cooperative relation with the mold, a second fluid cylinder having a piston therein operatively connected to the bottom closure, and automatic means for admitting fluid pressure to one end of both cylinders simultaneously and for thereafter admitting fluid pressure to the other end of the cylinders successively, substantially as described.

31. A molding machine including a mold chamber, a feed box therefor having a movable bottom closure, a fluid cylinder having a piston therein operatively connected to the feed box for moving it into and out of cooperative relation with the mold, a fluid cylinder having a piston therein operatively connected to the bottom closure, an automatically operated valve for controlling the fluid, a single fluid line from the valve to one end of the first mentioned cylinder whereby fluid pressure may be communicated to the cylinder for moving the feed box into cooperative position with the mold, a passage of relatively larger area than said fluid line connecting such end of the first cylinder with the corresponding end of the second cylinder whereby the closure is moved with the feed box, a fluid line from the valve to the other end of the cylinder for the bottom closure, and a fluid line from the valve to the other end of the cylinder for the feed box whereby the bottom closure and the feed box may be returned to their original position, the valve being adapted to communicate fluid pressure to the three fluid lines in the order described, substantially as described.

32. A molding machine including a mold chamber open at its upper end, a feed box having a slidable bottom closure, fluid operated means for moving the box into and out of position over said chamber, fluid operated means for advancing said bottom closure simultaneously with the box and then withdrawing the same before the box begins its return stroke, and a single automatically actuated valve for controlling the operation of both of said means in timed relation, substantially as described.

33. A molding machine including a mold chamber open at its upper end, a feed box having a slidable bottom closure, fluid operated means for simultaneously advancing the box and its closure into position over the chamber and then withdrawing the bottom closure while the box remains in position over the chamber, said means comprising a cylinder having a piston working therein and provided with a piston rod flexibly connected to the box, and a second cylinder having a piston working therein and flexibly connected to the bottom closure, substantially as described.

34. A molding machine including a stationary mold chamber open at its upper end, means for depositing a pallet in the chamber through the upper end thereof, and means for depositing the material to be molded into the chamber through said upper end thereof, substantially as described.

35. A molding machine including a mold chamber open at its upper end, a feed box having provision for carrying a pallet into position over the chamber, means for moving the box into and out of position over the chamber, and a pallet feed mechanism including means for moving a pallet into operative relation to the box prior to the movement thereof into position over the chamber, substantially as described.

36. A molding machine including a mold chamber open at its upper end, a feed box having provision for carrying a pallet into position over the chamber, means for moving the box into and out of position over the chamber, and means for ejecting a molded article from the chamber and simultaneously moving a pallet into operative relation to the box, substantially as described.

37. A molding machine including a mold chamber open at its upper end, and common means for depositing a pallet and material to be molded into the chamber through the upper end thereof, substantially as described.

38. A molding machine including a mold chamber having a core therein, a plunger adapted to enter the chamber and having an opening opposite the core, and a yielding diaphragm carried by said plunger and covering said opening, substantially as described.

39. A molding machine comprising a mold chamber having a core therein, a plunger adapted to enter the chamber and having a compartment opposite said core, a block slidable in said compartment, yielding means urging said block outwardly, said block having an opening therein adapted to receive said core, and a yielding diaphragm carried by said plunger and extending over the outer face of said block and forming a closure for said compartment and opening in said block, substantially as described.

40. A molding machine including a pallet box, means for feeding the bottom pallet from the box to the machine, and means for maintaining the remaining pallets partially out of contact with the bottom pallet, substantially as described.

41. A molding machine including a pallet box, means for feeding the bottom pallet forwardly from the box to the machine, and means for maintaining the rearward portion of the pallets above the forward portion thereof, substantially as described.

42. A molding machine including a pallet box, means for feeding a pallet from the box to the machine, and a plurality of guide means for accommodating different sizes of pallets, substantially as described.

43. A molding machine including a pallet box, means for feeding the bottom pallet from the box to the machine, a plurality of guide means for accommodating different sizes of pallets, and means for adjusting the position of said guide means according to the size of pallets being used, substantially as described.

44. A molding machine including a pallet box, and yielding means for engaging a pallet and feeding it to the machine, substantially as described.

45. A molding machine including a pallet box, means for engaging a pallet and feeding it to the machine, said means including a spring, substantially as described.

In testimony whereof I have hereunto set my hand.

DAVID C. GOLDSTON.